July 16, 1963 H. GERBER 3,098,211
UNDERWATER ACOUSTIC PRESSURE MEASURING DEVICE
Filed Oct. 14, 1960 3 Sheets-Sheet 1

INVENTOR.
HENRY GERBER

INVENTOR.
HENRY GERBER 3,098,211
UNDERWATER ACOUSTIC PRESSURE
MEASURING DEVICE
Henry Gerber, 2834 R St. SE., Washington, D.C.
Filed Oct. 14, 1960, Ser. No. 62,803
11 Claims. (Cl. 340—8)
(Granted under Title 35, U.S. Code (1952), sec. 266)

The invention described herein may be manufactured and used by or for the Government of the United States of America for governmental purposes without the payment of any royalties thereon or therefor.

This invention relates to the field of underwater acoustics and is more particularly concerned with a testing device for accurately determining the characteristics of an underwater transducer.

There are several methods presently available for calibrating underwater transducers in the laboratory. None of these methods are capable of producing an accurately known radiation load on the transducer equal to the radiation load experienced by the transducer in a large body of water such as the ocean where these transducers are commonly employed. Furthermore, the older test systems are unduly restricted in their frequency range, the upper frequency being limited to about 500 c.p.s. Many of the systems required the deaeration of the water employed thereby necessitating the use of complex equipment and elaborate auxiliary electronic gear. It has been found that transducers with a low acoustic impedance are difficult to calibrate by these old methods.

It is one object of this invention to provide apparatus for producing a predetermined, accurately measurable, acoustic pressure on an underwater transducer in a laboratory environment.

Another object of this invention is the provision of a new and improved transducer test device having a wide frequency range and capable of testing transducers up to 2500 c.p.s.

Another object is the provision of an improved transducer test device which is small and compact and provides the same radiation load on the transducer that would be encountered in actual field use of the transducer.

These and many other objects will become more readily apparent when the following specification is read and considered along with the attendant drawings wherein like numerals designate like or similar parts throughout the several views and in which.

As employed herein the term "transducer" includes microphones, projectors and pressure detectors. The following terms are defined in accordance with standard acoustical practice as set forth:

*Equivalent piston.*—Equivalent piston is a term that is often used in calculations to replace a diaphragm. The equivalent piston is a surface which vibrates at all parts with the same velocity as a specified point on the diaphragm, and has an area such that it constitutes a source of sound of the same strength as the diaphragm.

*Free field.*—A free field is an isotropic, homogeneous, sound field free from bounding surfaces.

*Free field radiation load.*—The radiation impedance at a surface vibrating in a free field is that portion of the total impedance which is due to the radiation of sound energy into the free field. This radiation impedance is also referred to as the free field radiation load. The total impedance of a transducer at a diaphragm is equal to the sum of the internal impedance of the transducer and the radiation impedance.

*Normal mode of pressure.*—The normal mode of pressure is one of the possible pressure distributions which a system will acquire of its own accord as a result of a disturbance of the system. It will have a frequency depending solely on the properties of the system.

Figure 1:
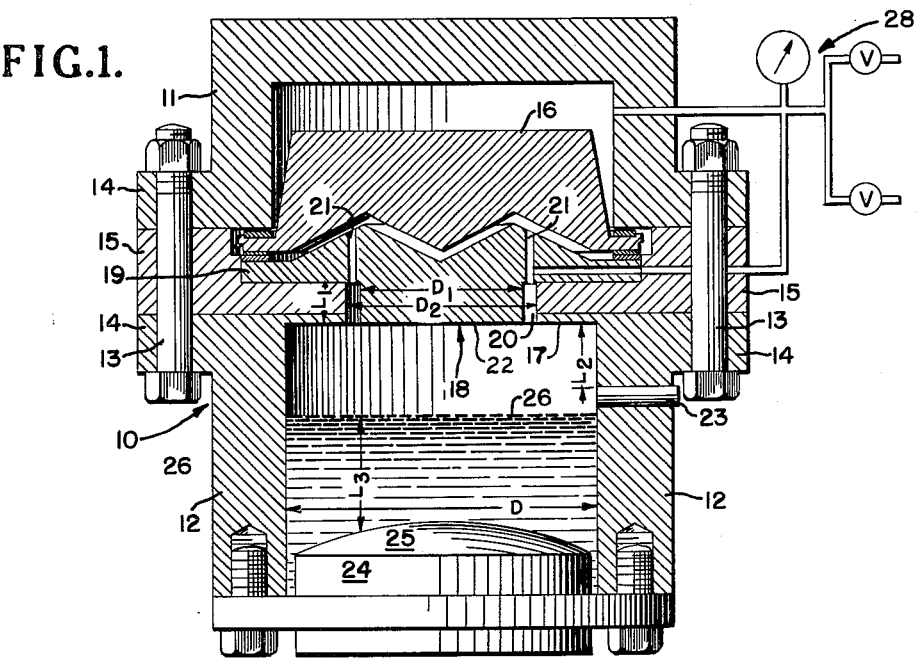
FIG. 1 is a view partially in section of a test device constructed according to the principles of this invention.
Figure 2:
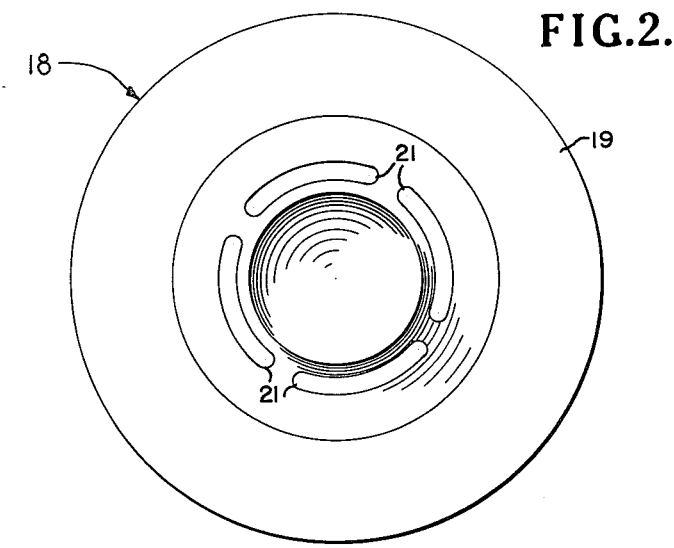
FIG. 2 is a top view of an acoustic filter employed in the practice of this invention.

Referring now to FIG. 1 the apparatus employed in this test device comprises a chamber 10 having an upper section 11 and a lower section 12 which are secured together with a plurality of bolts 13 or the like, at the mating flanges 14 theerof. Interiorly of upper chamber 11 a speaker 16 is supported. For ease of assembly, an insert 15 may be provided between sections 11 and 12. At the internal mating portions of the insert 15 and lower chamber a pair of matching annular rings are formed integral with their respective chamber halves to provide a circumferential support 17. Disposed within the chamber 10 and supported by member 17 is what is known in this art as an acoustic filter 18 which is shaped as shown in FIG. 1 to be everywhere substantially equidistant from speaker 16. This filter includes a disk-like portion 19 which rests upon and is supported by the circumferential support 17. A plurality of generally kidney-shaped holes 21 are formed through the disk. A cylindrical portion of filter 18 depends from the disk into the circular opening formed by the circumferential support 17. The diameter D1 of this member is shorter than the internal diameter D2 of the circumferential support 17 so that an annular space 20 is provided between the two. This annular space is disposed directly below the kidney-shaped holes 21. The purpose of the filter 18 will be described in more detail hereinafter.

A reference microphone 23 is positioned with its active face at the internal wall of the lower chamber 12. Affixed at the bottom end of the lower chamber 12 is a transducer 24 having a diaphragm 25 disposed interiorly of the chamber. Water fills the lower half 12 of the chamber to a predetermined depth as indicated at 26. Above the surface of the water is a gas such as air, helium, or more preferably hydrogen. Hydrogen generally may be a preferred gas because of its low molecular weight and its correspondingly high velocity of sound transmission therethrough. A small diameter bypass tube (not shown) may be formed in the wall of the upper chamber to connect the front and back volumes of loud speaker 16 to equalize gradual pressure variations on opposite sides of the speaker thereby preventing the destruction of this speaker by high ambient pressures. A system of valves and piping indicated generally at 28 is utilized to evacuate the air from the upper portion of the chamber and to pump in the gas utilized during the test. The water in contact with the transducer and the gases in the rest of chamber 10 constitute the acoustic media in the device.

Figure 3:
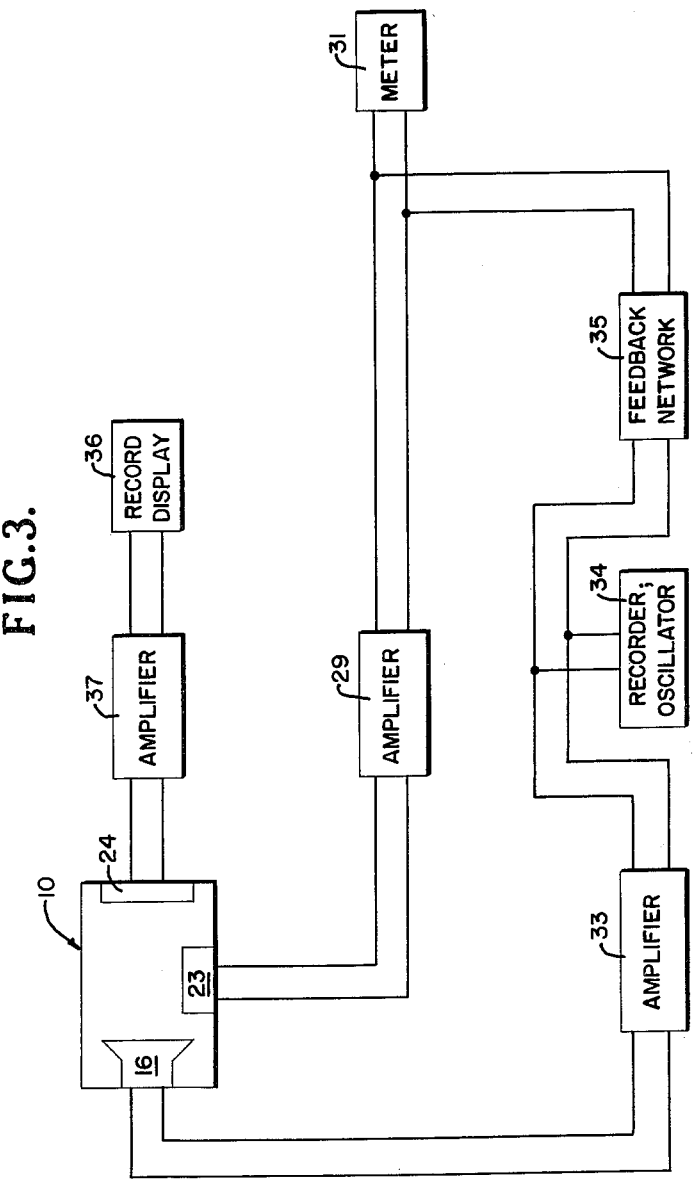
FIG. 3 is a block diagram of the auxiliary equipment employed with the apparatus of this invention.

The electronic apparatus associated with the device is shown in the block diagram of FIG. 3. A variable frequency oscillator 34 having means for adjusting the voltage amplitude drives a power amplifier 33 which in turn energizes the loud speaker shown at 16. The speaker is acoustically coupled to the reference microphone 23 so that the microphone generates an output voltage upon energization of the loud speaker, and this voltage is amplified by the amplifier 29 and its magnitude measured by voltmeter 31 which is graduated in db and microbar. The amplifier voltage is rectified and returned to the speaker circuit via the feedback network 35. This feedback assures that the acoustic pressure of the signal does not vary with the frequency thereof. At a fixed frequency, the oscillator is adjusted to give the desired voltage amplitude or acoustic pressure level in the chamber as indicated by meter 31. It is of course necessary that the oscillator and the power amplifiers 29 and 33 respectively have a relatively flat frequency response. The acoustic signals impressed upon the reference microphone 23 also are impressed upon the transducer 24. The electrical output from the transducer resulting from the acoustic input received through the water may be amplified by the voltage amplifier 37 and fed into a recording or display device 36 shown as the automatic frequency response recorder in FIG. 3. The desired acoustic pressure which acts on the transducer through the water is held constant by the combination of the reference microphone and feedback circuit, and thus the voltage recorded by the recorder is the output voltage of the transducer corresponding to the desired acoustic pressure.

Figure 4:
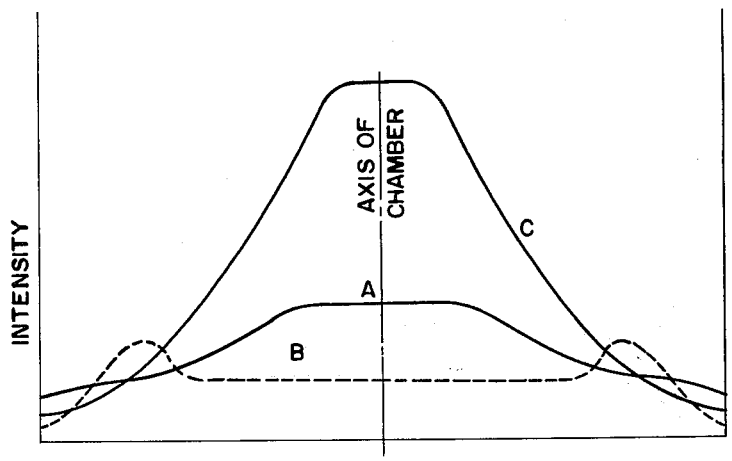
FIG. 4 is a plot of the intensity of the acoustic signals as measured across chamber 10.

To obtain correct calibration results, it is necessary that the acoustic pressure be constant over the whole area of the gas-water interface. It is the purpose of filter 18 to accomplish this. The acoustic pressure in the gaseous medium generally assumes the shape of curves A, B, and C in FIG. 4. Curve A is the curve which would be expected for the lower frequency signals while curve C is for the higher frequency signals. The shape of these curves can be explained by assuming that the total pressure at any radial distance from the longitudinal axis of the chamber consists of the sum of the pressures produced by the normal modes of pressure of the chamber. The "zero mode" has a constant magnitude across the whole area. This constant magnitude is the desired pressure distribution. The "first mode" has its maximum value at the axis of the chamber, while higher modes have their maxima at various distances from the axis. At low frequencies, the magnitude of the zero mode is much larger than the higher modes, therefore the pressure is constant across the whole area. As the frequency increases, the magnitude of the first mode increases, and therefore the magnitude of the pressure tends to increase near the axis.

Filter 18 eliminates the first mode of pressure, and thus only the second and higher modes which have a relatively small magnitude contribute to the nonuniform pressure. Accordingly, the pressure profile of the acoustic pressure signal in the gaseous medium in the lower portion of the chamber is generally in the shape of curve B which is virtually flat in comparison with the other curves.

The dimensions of the chamber must be controlled when the chamber is to be used to test transducers of varying size. For a typical transducer, D1, the diameter of member 22 of filter 18, should be 0.57 times the internal diameter "D" of the lower chamber, D2, the internal diameter at supporting flange 17, should be about 0.68 times the internal diameter D, $L_1$, the depth of the member 22 should be about 0.15D or larger, $L_2$, the distance from the element 22 to the top of the reference microphone measured in vertical distance should be about 0.2 or larger.

$L_3$ is the height of water over the transducer diaphragm 25. If the diaphragm is curved as shown in the drawings, $L_3$ is the average height from the diaphragm to the gas-water interface. $L_3$ is carefully controlled to accurately simulate the free field radiation load which would be encountered in actual field use of the hydrophone. The relative magnitude of $L_3$ is a function of the diameter of the "equivalent piston" of diaphragm 25. In those cases where the movement of the diaphragm is not uniform across its diameter the diameter of the corresponding "equivalent piston" is less than that of the actual diaphragm.

Table 1 indicates the relative length of $L_3$ as a function of R, where R equals the ratio of the equivalent piston diameter to chamber diameter.

*Table 1*

| R | .1 | .2 | .3 | .4 | .5 | .6 | .7 | .8 | .9 | 1.0 |
|---|---|---|---|---|---|---|---|---|---|---|
| $L_3$ | .580D | .551D | .544D | .537D | .527D | .516D | .500D | .481D | .457D | .424D |

If the chamber diameter is 4 inches, the diaphragm diameter 2 inches, and the equivalent piston diameter 1.8 inches, then $R=1.8/4=.45$. Interpolating between .4 and .5 in Table 1 $L_3=.523\times 4=2.128$. For practical purposes $L_3$ can be taken as 2.1 with negligible error.

The upper frequency limit of the system is inversely proportional to the chamber diameter and for a four-inch diameter is approximately 2500 c.p.s. For greater chamber diameter, the upper frequency limit decreases.

It should be noted that the gas-water interface presents a substantially free boundary and for a properly selected value of $L_3$, the radiation loading of the transducer 24 within the chamber is substantially the same as would be encountered if the transducer were disposed in a large body of water having effectively infinite boundaries. This use of the gas-water interface overcomes one of the great disadvantages of the prior art laboratory test chambers in that these prior art devices were notorious for producing improper radiation loading on the transducer.

Figure 5:
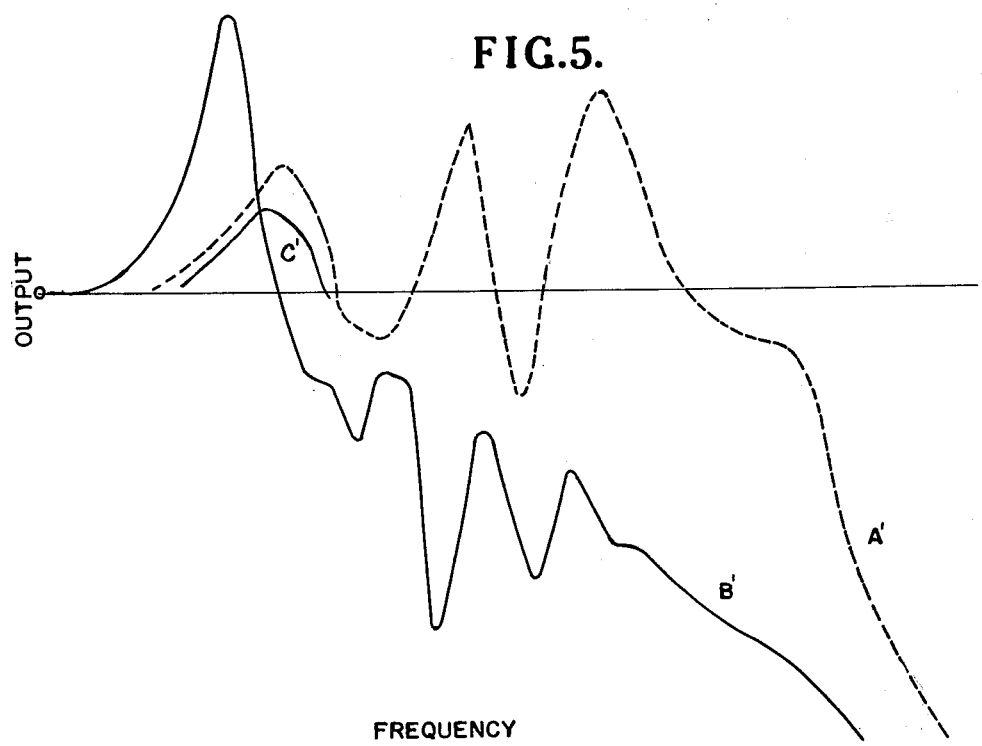
FIG. 5 is a series of typical response curves of transducers tested according to the methods and principles of this invention as compared with the response curve obtained utilizing prior art methods and those obtained in actual field use.

As can be seen in FIG. 5, the response of a typical hydrophone tested in a laboratory system constructed according to the principles of this invention compared with the prior art laboratory test systems. Curves A′ and B′ indicate the response obtained when the chamber is filled with helium, and helium and water respectively. It was not possible to distinguish between these curves and the curves obtained in a field test in air and water respectively. Contrasted with these results, curve C′ indicates the results obtained utilizing a conventional laboratory test set up.

The effective depth of water in which the transducer is operating may be simulated by increasing the pressure of the gas above the liquid. Accordingly this invention provides a simple method for rapidly changing the static pressure from a fraction of a p.s.i. up to about 300 p.s.i. at a wide variety of temperatures. The apparatus permits establishment of the same acoustic pressure on the transducer under test which it would experience if it were located in an acoustic "free field" and were exposed to a known acoustic pressure. The use of helium or hydrogen permits the raising of the frequency of the acoustic pressure signal to a value up to about six times that which may be employed in the present systems. Accordingly, it is apparent that by this invention there has been provided a much improved test device which may be utilized to investigate the responses of hydrophones under an almost limitless variety of conditions and to accurately record the sensitivity of the hydrophone under these conditions.

Having thus described the invention with reference to but one illustrative example, it should be understood that it is susceptible of many alterations and modifications without departing from the spirit or scope thereof. Ac- cordingly, the foregoing specification should not be construed as limiting this invention in any manner. Rather the invention is to be construed by the appended claims only.

What is claimed as new and desired to be secured by Letters Patent of the United States is:

1. Apparatus for testing the response of a test transducer comprising: chamber means for receiving the test transducer therewithin, a reference transducer secured within said chamber means, acoustic signal producing means disposed within said chamber for impressing an acoustic signal upon said reference transducer and the test transducer, and means for providing a liquid-gas interface between said acoustic signal producing means and the test transducer thereby to simulate a free field radiation load on the test transducer.

2. The apparatus of claim 1 further comprising: acoustic filter means disposed between said acoustic signal producing means and the liquid gas interface to produce substantially equal input loadings at all portions of said interface.

3. Apparatus for testing the response of a transducer comprising: a chamber, liquid means partially filling said chamber, a transducer to be tested disposed in said liquid means, a reference transducer disposed within said chamber and out of contact with said liquid means, acoustic signal producing means disposed in said chamber and out of contact with said liquid means for impressing an acoustic signal upon said reference transducer and through the liquid means onto the transducer to be tested.

4. The apparatus of claim 3 further comprising: electronic means coupled to said acoustic signal producing means for operating said acoustic signal producing means to selectively vary the frequency of the acoustic signal produced, feedback means connected between said reference transducer and said electronic means, for rendering the amplitude of the acoustic signal produced independent of frequency.

5. The apparatus of claim 3 wherein the height of the liquid means is selected to simulate free field acoustic conditions on the transducer to be tested.

6. Apparatus for testing the response of a transducer having a diaphragm with a predetermined equivalent piston diameter comprising; a chamber having a predetermined diameter, liquid means partially filling said chamber and in contact with the diaphragm of the transducer, the height of said liquid means above said diaphragm being correlative to the ratio between the diameter of the equivalent piston and the chamber diameter, means disposed in said chamber out of contact with said liquid means for impressing an acoustic signal of predetermined amplitude and frequency onto said transducer.

7. The apparatus of claim 6 wherein the height of the liquid means above the diaphragm is from about .42 to about .58 times the diameter of the chamber.

8. The apparatus of claim 7 wherein the diameter of the chamber is about four inches.

9. The apparatus of claim 6 wherein said liquid means is water and further including a gas filling a portion of said chamber to provide a liquid gas interface within the chamber.

10. The apparatus of claim 9 wherein said gas is selected from the group consisting essentially of air, hydrogen and helium at pressures up to about 300 p.s.i.

11. Apparatus for testing the response of transducer means having an input diaphragm comprising; a chamber for receiving the transducer means, speaker means disposed in said chamber, an electronic circuit including feedback means electrically coupled to said speaker means for producing an acoustic signal of selectively variable frequency and controlled amplitude within said chamber, a liquid partially filling said chamber and a gas partially filling the chamber and together with the liquid providing a liquid-gas interface at a selected distance from the diaphragm of the transducer means, filter means disposed in said chamber to equalize the acoustic signal on all portions of said liquid gas interface, and a reference transducer disposed in said chamber and electrically coupled to said electronic circuit for indicating the amplitude of the acoustic signal in conjunction with said circuit.

References Cited in the file of this patent

UNITED STATES PATENTS

| | | |
|---|---|---|
| 2,530,383 | Estes | Nov. 21, 1950 |
| 2,558,550 | Fiske | June 26, 1951 |
| 2,874,794 | Kiernan | Feb. 24, 1959 |